(12) United States Patent
Prociw et al.

(10) Patent No.: US 9,109,842 B2
(45) Date of Patent: Aug. 18, 2015

(54) FUEL AIR HEAT EXCHANGER

(75) Inventors: Lev Alexander Prociw, Johnston, IA (US); Eduardo Hawie, Woodbridge (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 714 days.

(21) Appl. No.: 13/404,789

(22) Filed: Feb. 24, 2012

(65) Prior Publication Data
US 2013/0219915 A1 Aug. 29, 2013

(51) Int. Cl.
F02C 7/224 (2006.01)
F02C 7/12 (2006.01)
F28D 7/10 (2006.01)
F01D 25/14 (2006.01)
F28D 7/00 (2006.01)
F28D 7/14 (2006.01)

(52) U.S. Cl.
CPC ............... *F28D 7/106* (2013.01); *F01D 25/14* (2013.01); *F02C 7/12* (2013.01); *F02C 7/224* (2013.01); *F28D 7/005* (2013.01); *F28D 7/14* (2013.01)

(58) Field of Classification Search
USPC ........... 60/736, 730, 734, 737, 782, 266, 267, 60/728, 805, 806, 748; 137/605, 875, 876; 165/154, 157, 169
See application file for complete search history.

(56) References Cited

U.S. PATENT DOCUMENTS

| | | | |
|---|---|---|---|
| 4,120,150 A | 10/1978 | Wakeman | |
| 4,404,793 A | 9/1983 | Coffinberry | |
| 4,550,561 A | 11/1985 | Coffinberry | |
| 5,063,963 A | 11/1991 | Smith | |
| 5,152,146 A | 10/1992 | Butler | |
| 5,241,814 A | 9/1993 | Butler | |
| 5,317,877 A | 6/1994 | Stuart | |
| 5,414,992 A | 5/1995 | Glickstein | |
| 5,619,855 A | 4/1997 | Burrus | |
| 6,182,435 B1 | 2/2001 | Niggemann et al. | |
| 6,253,554 B1 | 7/2001 | Kobayashi et al. | |
| 6,269,626 B1 | 8/2001 | Kim | |
| 6,415,595 B1 | 7/2002 | Wilmot, Jr. et al. | |
| 6,578,362 B1 | 6/2003 | Coffinberry | |
| 6,584,778 B1 | 7/2003 | Griffiths et al. | |
| 6,672,072 B1 | 1/2004 | Giffin, III | |
| 6,931,834 B2 | 8/2005 | Jones | |
| 6,993,913 B2 | 2/2006 | Kobayashi et al. | |
| 7,213,391 B2 | 5/2007 | Jones | |
| 7,231,769 B2 | 6/2007 | Spadaccini et al. | |
| 7,740,443 B2 * | 6/2010 | Seitzer et al. | 415/116 |
| 7,874,139 B2 * | 1/2011 | Briesch et al. | 60/39.464 |
| 8,020,366 B2 | 9/2011 | Cowan | |
| 8,307,662 B2 * | 11/2012 | Turco | 60/782 |
| 2007/0199319 A1 * | 8/2007 | Bender | 60/599 |
| 2008/0304958 A1 | 12/2008 | Norris et al. | |
| 2010/0319359 A1 | 12/2010 | Holt et al. | |
| 2011/0232293 A1 | 9/2011 | Leese | |

\* cited by examiner

*Primary Examiner* — Phutthiwat Wongwian
*Assistant Examiner* — Steven Sutherland
(74) *Attorney, Agent, or Firm* — Norton Rose Fulbright Canada

(57) ABSTRACT

A fuel air heat exchanger for a gas turbine engine having fuel and air conduits in heat exchange relationship with one another, and a distribution conduit in heat exchange relationship with a component to be cooled. The distribution conduit is in fluid communication with the outlet of each air conduit. The heat exchanger also includes a secondary air inlet in fluid communication with the distribution conduit and a flow selection member selectively movable between first and second configurations. In the first configuration, the flow selection member closes the fluid communication between the secondary inlet and the distribution conduit. In the second configuration, the flow selection member opens the fluid communication between the secondary air inlet and the distribution conduit.

15 Claims, 14 Drawing Sheets

FUEL AIR HEAT EXCHANGER

TECHNICAL FIELD

The application relates generally to a heat exchanger for a gas turbine engine and, more particularly, to such a heat exchanger putting fuel and compressed air in heat exchange relationship with one another.

BACKGROUND OF THE ART

Gas turbine engines typically become more efficient with higher turbine inlet gas temperatures. However higher turbine inlet gas temperatures necessitate increased cooling of the turbine components.

It has been known to provide a heat exchanger located in low pressure areas of the engine or outside of the engine casing, where fuel is put into heat exchange relationship with the pressurized air from the combustor to heat the fuel before combustion and cool the pressurized air surrounding the high pressure turbine. Such heat exchanger typically require a high pressure casing to contain the pressurized air and relatively heavy air ducts to circulate the pressurized air to and from the heat exchanger.

SUMMARY

In one aspect, there is provided a fuel air heat exchanger for a gas turbine engine, the heat exchanger comprising: at least one fuel conduit and at least one air conduit extending in heat exchange relationship with one another, each fuel conduit having an inlet for communication with a fuel source and an outlet for communication with fuel distribution conduits of the engine, each air conduit having an inlet and an outlet; a distribution conduit in heat exchange relationship with a component to be cooled, the distribution conduit being in fluid communication with the outlet of each air conduit; a secondary air inlet in fluid communication with the distribution conduit; and a flow selection member selectively movable between first and second configurations, the flow selection member in the first configuration closing the fluid communication between the secondary inlet and the distribution conduit, the flow selection member in the second configuration opening the fluid communication between the secondary air inlet and the distribution conduit.

In another aspect, there is provided a gas turbine engine comprising: a compressor section; an annular high pressure plenum in fluid flow communication with a discharge of the compressor section for receiving compressed air; a combustor contained in the high pressure plenum; a heat exchanger located in the high pressure plenum, the heat exchanger including: at least one fuel conduit and at least one air conduit extending in heat exchange relationship with one another, each fuel conduit having an inlet in fluid communication with a fuel source of the engine and an outlet in fluid communication with fuel distribution conduits of the combustor, each air conduit having an inlet and an outlet, a distribution conduit for distribution of air to a component to be cooled, the distribution conduit being in fluid communication with each air outlet, a secondary air inlet in fluid communication with the distribution conduit, and a flow selection member selectively movable between first and second configurations, the flow selection member in the first configuration closing the fluid communication between the secondary inlet and the distribution conduit, the flow selection member in the second configuration opening the fluid communication between the secondary air inlet and the distribution conduit.

In a further aspect, there is provided a method of regulating a cooling of an engine component of a gas turbine engine, the method comprising: circulating compressed air from a compressor discharge of the engine to a high pressure plenum containing a combustor of the engine; circulating fuel from a fuel source of the engine through at least one fuel conduit of a heat exchanger located in the high pressure plenum; and modulating a flow of the compressed air circulating from the high pressure plenum through at least one air conduit of the heat exchanger in heat exchange relationship with the at least one fuel conduit thereof and into a distribution conduit in heat exchange relationship with the engine component.

DESCRIPTION OF THE DRAWINGS

Reference is now made to the accompanying figures in which:

FIG. 10b is a tridimensional view of part of an exemplary heat exchanger corresponding to that of FIG. 10a;

FIG. 12b is a tridimensional view of part of an exemplary heat exchanger corresponding to that of FIG. 12a;

FIG. 13b is a tridimensional view of part of an exemplary heat exchanger corresponding to that of FIG. 13a;

DETAILED DESCRIPTION

Figure 1:
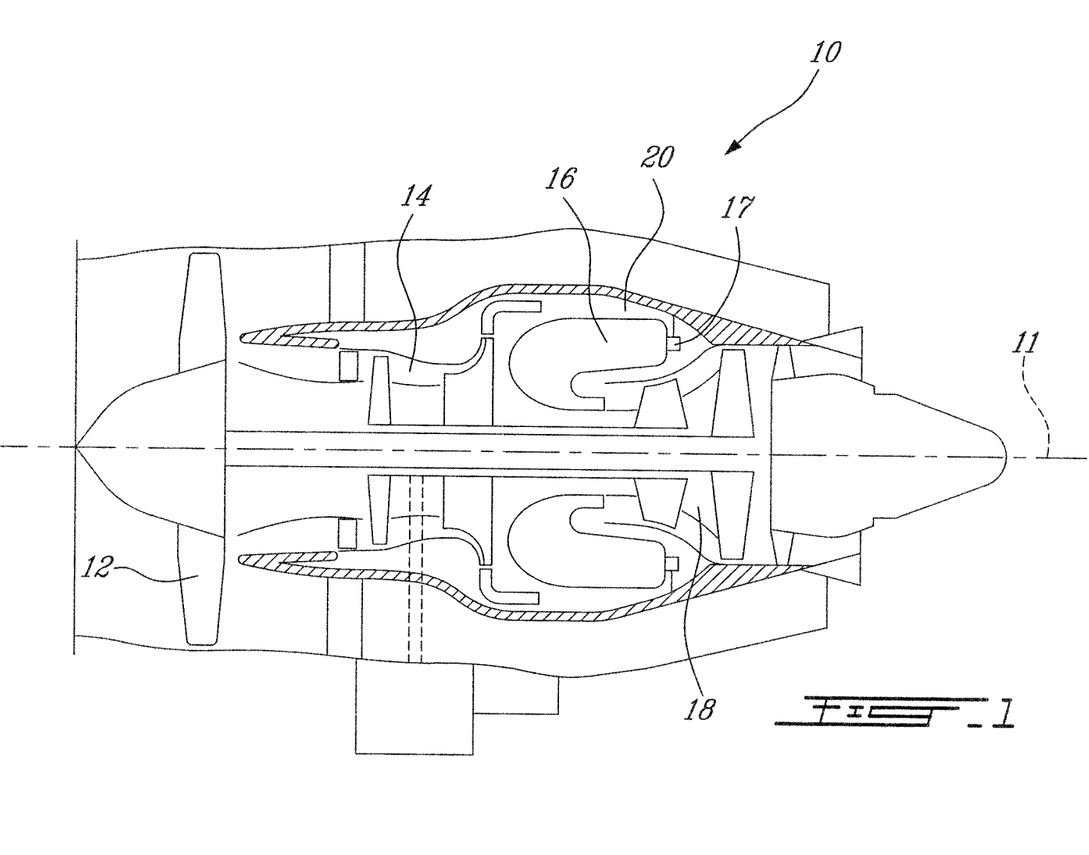
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes an annular high pressure plenum 20 in which the combustor 16 is contained. The high pressure plenum 20 is in fluid flow communication with a discharge of the compressor section 14 for receiving the compressed air. Although the combustor 16 is illustrated as being a reverse flow combustor, alternately the combustor can be a direct flow combustor. The engine 10 may also be an alternate type of gas turbine engine, such as for example a turboprop engine.

Figure 2:
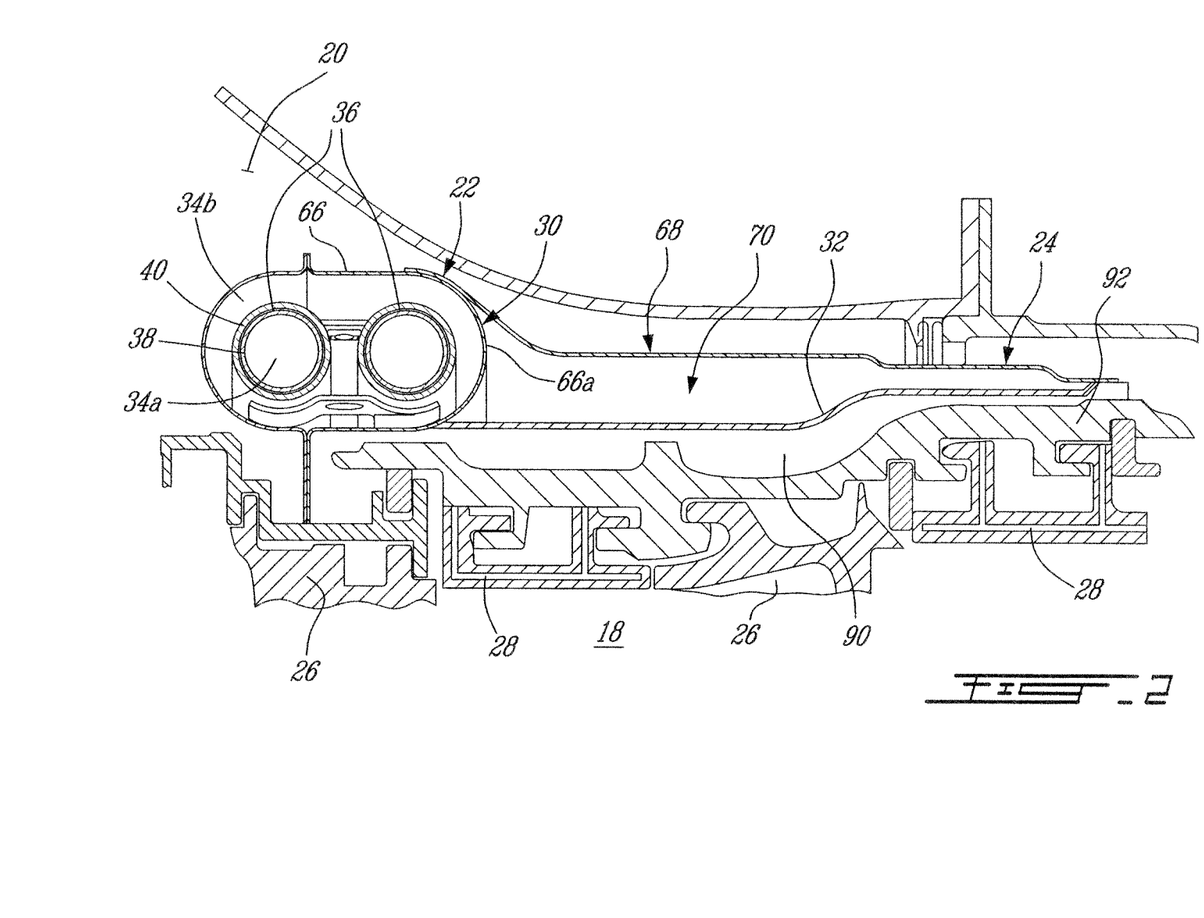
FIG. 2 is a schematic cross-sectional view of a heat exchanger in accordance with a particular embodiment and part of a gas turbine engine such as shown in FIG. 1.

Referring to FIG. 2, a heat exchanger 22 is located in the high pressure plenum 20. In the embodiment shown, the heat exchanger 22 is designed and positioned to cool an upstream portion of the turbine section 18, and in particular a turbine support case 92 surrounding the high pressure turbine vanes 26 and carrying shroud segments 28, such as to control the tip clearance of the turbine stages. It is understood that the heat exchanger configuration shown can alternately be adapted to cool other components of the gas turbine engine, for example oil, different air sources, metal parts, etc.

The heat exchanger 22 includes an annular duct 30 surrounding the engine component to be cooled, here the turbine support case 92. As shown, an annular perforated baffle 32 which surrounds the turbine support case 92 is part of the heat exchanger 22. The duct 30 contains at least one air conduit 34a,b and at least one fuel conduit 36 which extend around the circumferential direction of the duct 30 in heat exchange relationship with one another.

Figure 3:
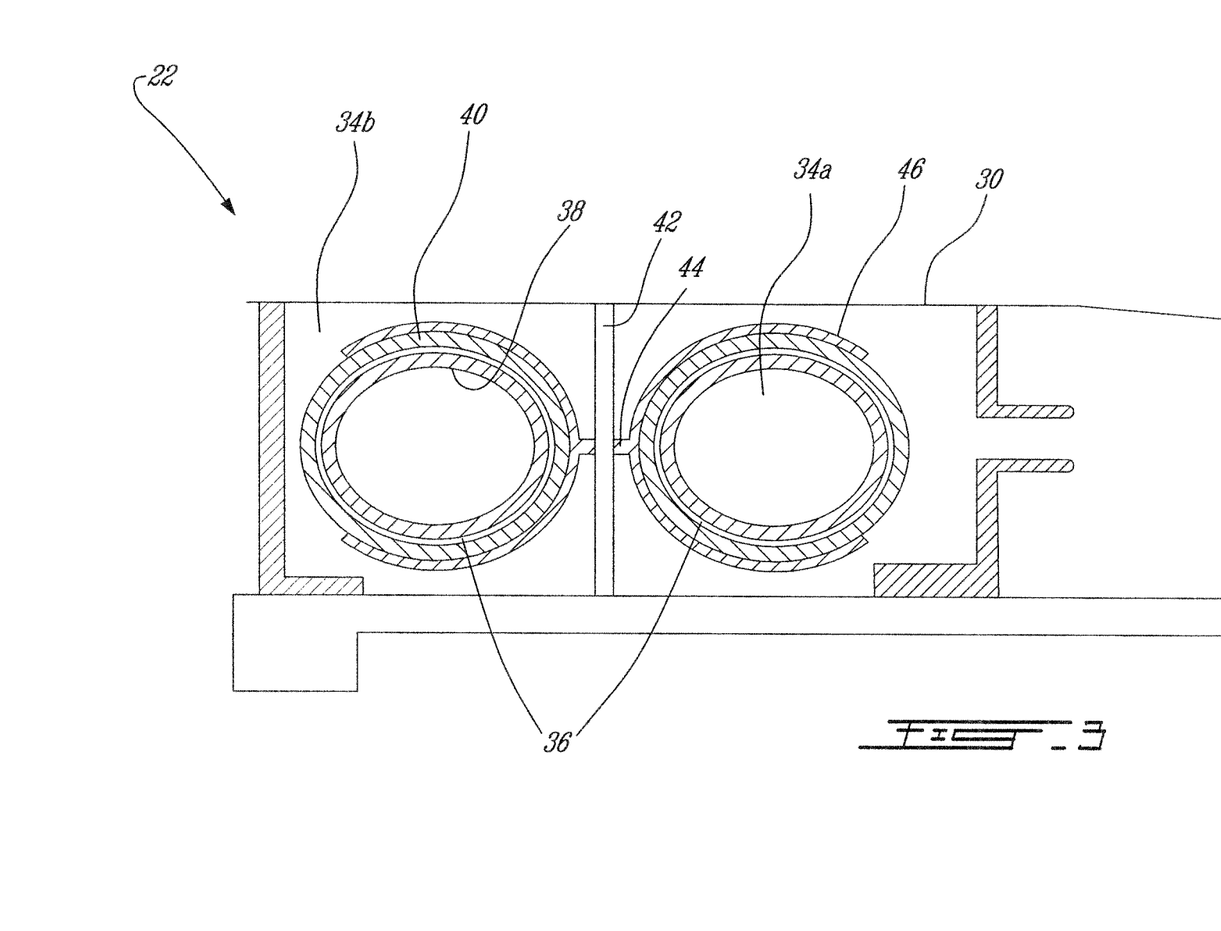
FIG. 3 is a schematic, partial cross-sectional view of the heat exchanger of FIG. 2.

In the embodiment shown in FIGS. 2 and 3, the heat exchanger includes two fuel conduits 36, which are each defined by an annular gap between inner and outer concentric tubes 38, 40 of slightly different diameters. In a particular embodiment, the gap measures between 0.015 inch and 0.05 inch, the gap size being selected based on the fuel flow rate and heat transfer required. In a particular embodiment, the fuel conduits 36 are retained by a radial mount 42 extending across the duct 30, from which extends a pin 44 retaining the fuel conduit 36, for example through a C-shaped member 46, to allow for thermal expansion and contraction of the conduits 36.

In a particular embodiment, the inner tube 38 is inserted in the outer tube 40 while the tubes are straight, and the tubes are then formed into the circular geometry. A spacer, for example a wire or granular filler material, is used between the tubes 38, 40 to maintain the gap during forming. Once the tubes have been deformed, the spacer can be removed.

The fuel conduits 36 of the heat exchanger 22 provide a fuel flow communication between a fuel source (not shown) and fuel distribution members 17 (see FIG. 1) of the combustor 16; in a particular embodiment, all of the fuel flow from the fuel source to the combustor 16 circulates through the heat exchanger 22. The quantity of fuel that is required to go through the heat exchanger 22 depends on the architecture of the fuel system and on the cooling requirements of the particular component being cooled; as such, in an alternate embodiment, only the primary flow or only the secondary flow are circulated through the heat exchanger 22.

Figure 4:
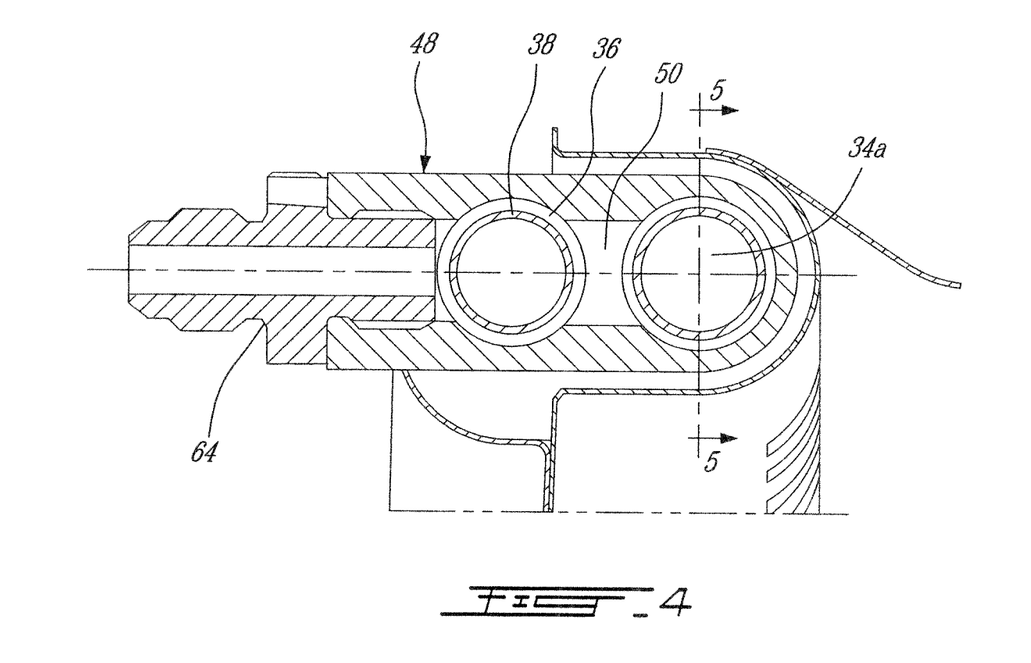
FIG. 4 is a schematic cross-sectional view of a fitting defining a fuel inlet and outlet of the heat exchanger of FIG. 2, taken along line 4-4 in FIG. 5.
Figure 5:
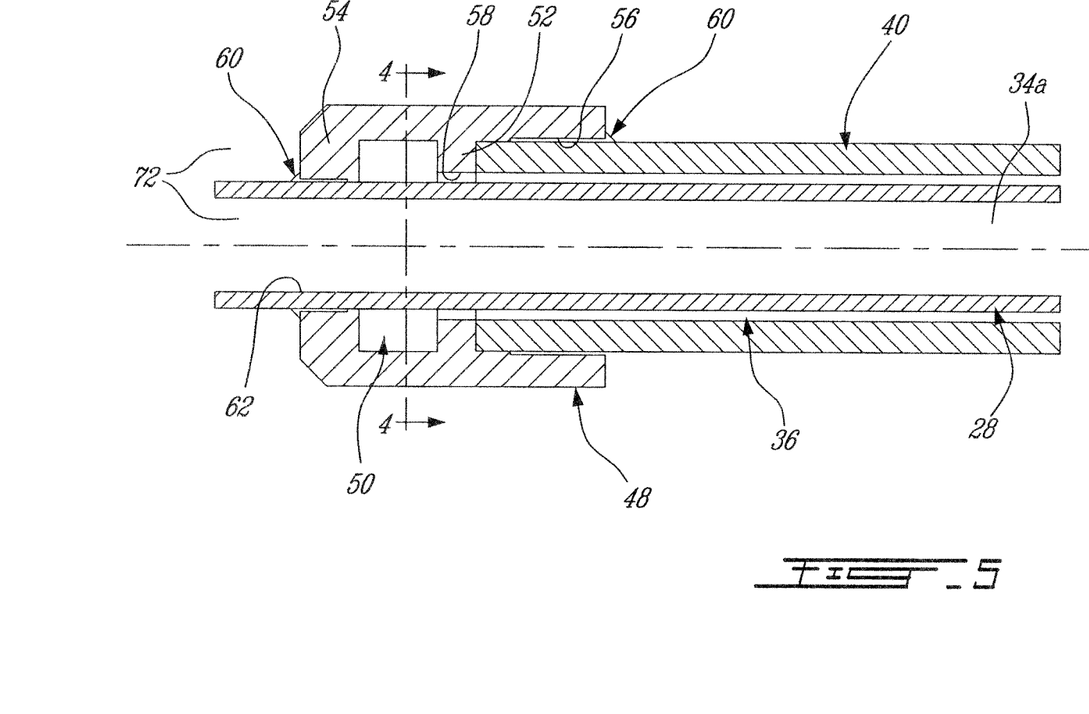
FIG. 5 is a schematic cross-sectional view of the fitting of FIG. 4, taken along line 5-5 in FIG. 4.

In a particular embodiment and referring to FIGS. 4 and 5, the inlet and outlet of the fuel conduits 36 are each provided by a respective end fitting 48 (only one of which is shown) which distributes fuel to or collects fuel from all the fuel conduits 36. Each fitting 48 encloses a fuel channel 50 partially defined by opposed inner and outer walls 52, 54. For each fuel conduit 36, the inner wall 52 includes a circular pocket 56 surrounding a circular hole 58 having an outer diameter corresponding to the inner diameter of the outer tube 40. The outer tube 40 is engaged in the pocket 56 and sealingly connected to the inner wall 52, for example through a brazed joint 60, while the inner tube 38 extends in the fitting 48 through the hole 58 in the inner wall 52, such as to form a fluid flow connection between the annular space between the tubes 38, 40 and the fuel channel 50. The outer wall 54 has a circular hole 62 through which the inner tube 38 sealingly extends, for example by connecting the inner tube 38 and the outer wall 54 through a brazed joint 60. A port with a connector 64 communicates with the fuel channel 50 and is designed to be complementary to end connectors of the fuel conduit (not shown) of the engine 10. This type of end fitting may facilitate visual and x-ray inspection of the joints.

Referring back to FIG. 2, in the embodiment shown, the heat exchanger 22 includes an air conduit 34a defined within the inner tube 38 of each fuel conduit 36, and a larger air conduit 34b defined by the free space in the annular duct 30 around the outer tubes 40 of the fuel conduits 36. The duct 30 is formed by one or more walls 66 of light weight sheet metal or other adequate light material, connected to form a closed cross-section such as to define the larger air conduit 34b. Since the heat exchanger 22 is located within the high pressure plenum 20, the pressure differential between the air conduit 34b and its surrounding environment is very small; as such, the duct 30 is not required to be made of high pressure casing material, and the thickness and weight of the wall(s) 66 can be minimized. In a particular embodiment the thickness of the wall(s) 66 is between 0.015 and 0.020 inches; it however understood that it could be larger or smaller depending on the size of the engine or the dynamic and stress requirements. In a particular embodiment the thickness of the wall(s) is less than 0.100 inch.

Figure 6:
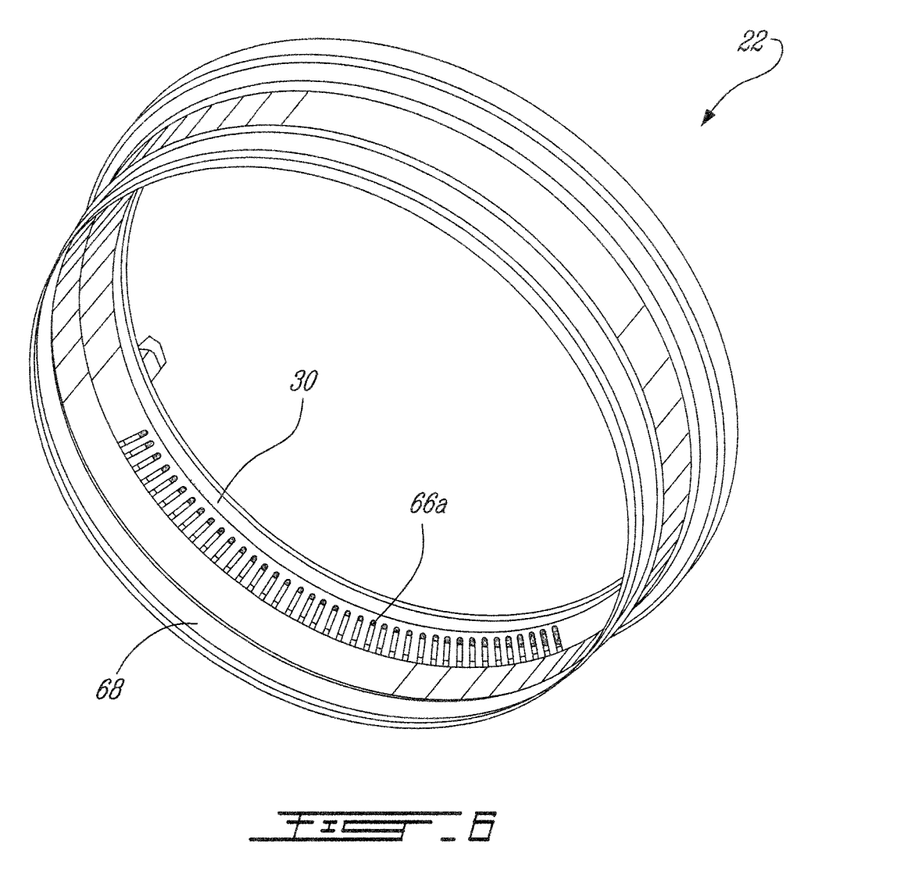
FIG. 6 is a tridimensional view of part of the heat exchanger of FIG. 2.

Referring to FIGS. 2 and 6, the heat exchanger 22 further includes an annular wall element 68 extending from the duct 30 along an approximately axial direction. The wall element 68 and an adjacent portion 66a of the wall(s) 66 of the duct 30 define a cross-sectional shape which is complementary to that of the annular baffle 32, such as to together form a closed cross-section. The wall element 68, the adjacent portion 66a of the duct wall and the baffle 32 together define a cooling plenum 70 which surrounds an annular cavity 90 around the turbine support case 92, and is in fluid flow communication therewith through the baffle 32.

Figure 7:
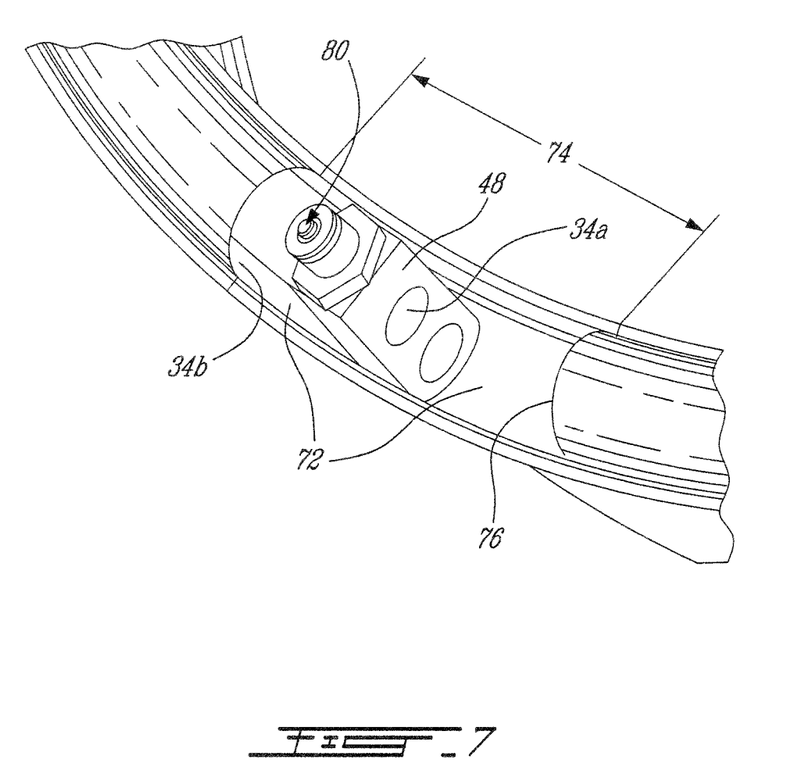
FIG. 7 is a partial tridimensional view of the heat exchanger of FIG. 2, showing an air inlet thereof.

The air conduits 34a,b define a fluid flow communication between the high pressure plenum 20 and the cooling plenum 70. In a particular embodiment and referring to FIGS. 5 and 7, the inlet 72 of the air conduits 34a, b is defined by an open section 74 in the duct 30 which is located in the high pressure plenum 20 and as such in direct fluid flow communication therewith. The end fitting 48 defining the outlet 80 of the fuel conduits 36 is preferably received in the open section 74, such as to define a counter flow heat exchanger, to reduce thermally induced stresses and maximize the heat transfer. However, the end fitting 48 defining the inlet 78 of the fuel conduits 36 (FIG. 8) can alternately be received in the open section 74. The air is free to flow in the inner tube 38 defining the fuel conduits 36, which is left open by the and fitting 48, and is also free to flow around the outer tubes 40 defining the fuel conduits 36 into the duct 30. A radial wall 76 closes the end of the open section 74 opposed that through which the fuel conduits 36 extend, so that the air is directed to flow along the fuel conduits 36 around the circumference of the duct 30.

Figure 8:
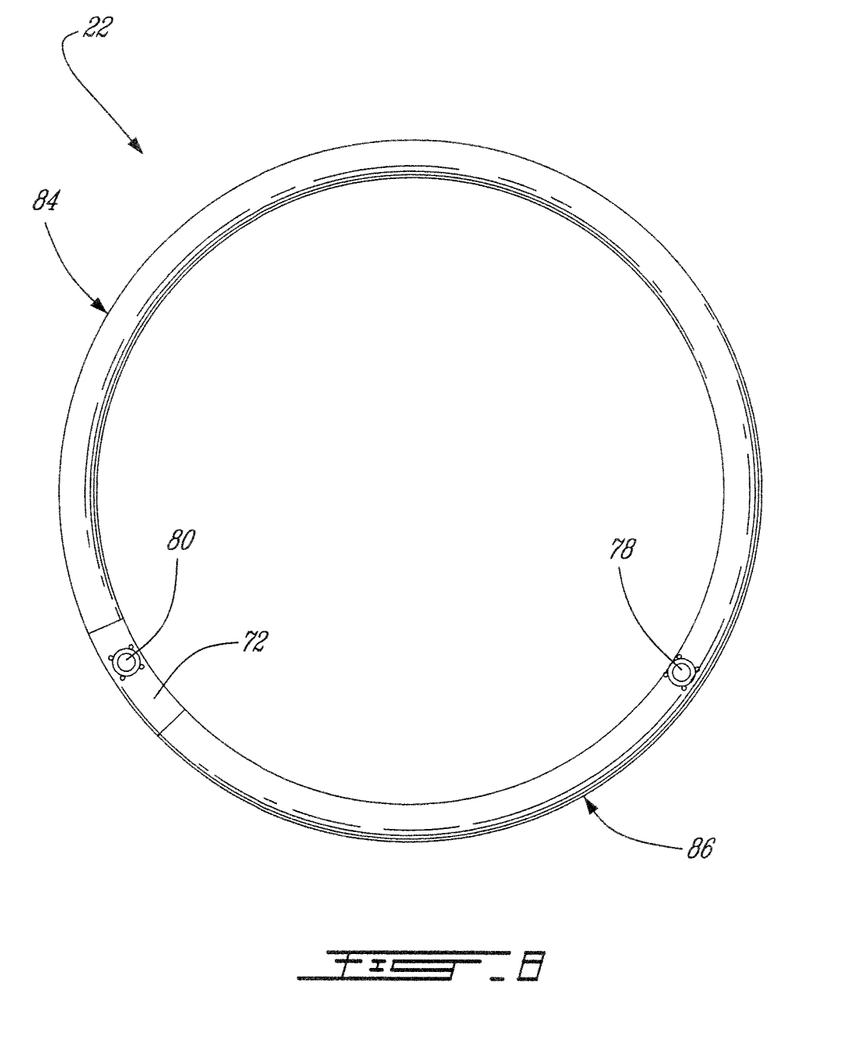
FIG. 8 is a front plan view of the heat exchanger of FIG. 2.
Figure 9:
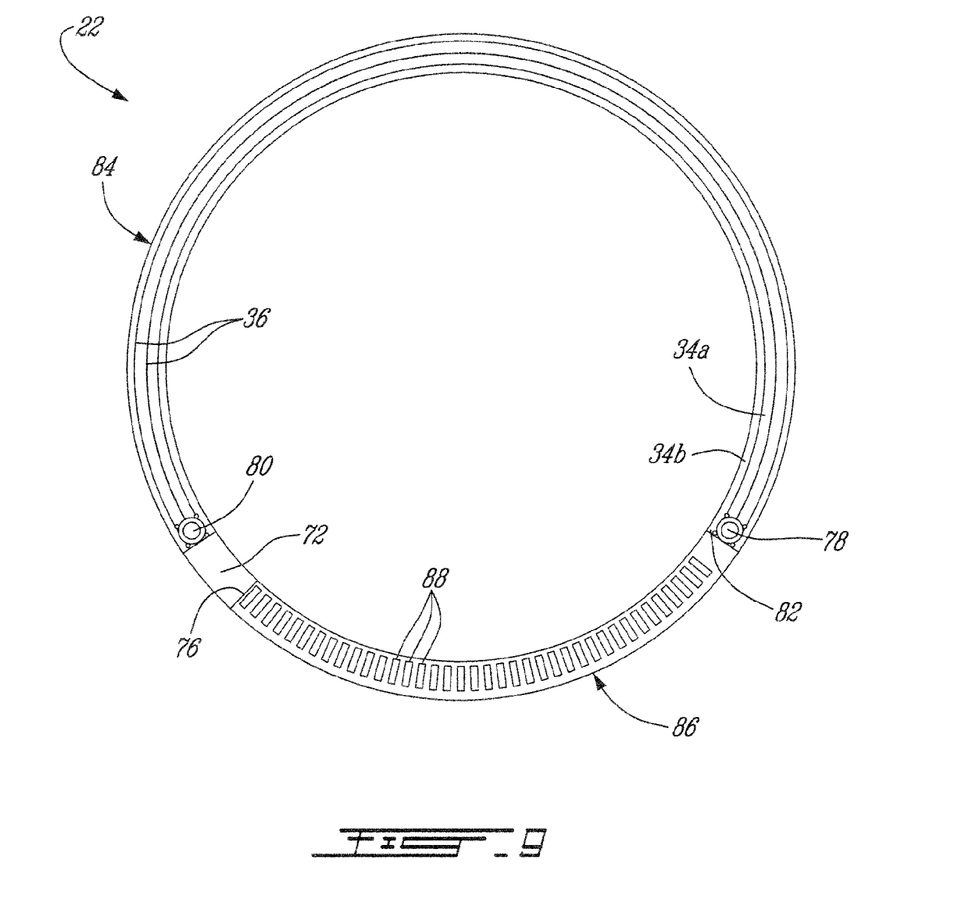
FIG. 9 is a front cross-sectional view of the heat exchanger of FIG. 2.

As can be seen in FIGS. 8-9, in the embodiment shown, the fuel conduits 36 extend around only part of the circumference of the duct 30. As such, the duct 30 has a first arcuate portion 84 containing the fuel conduits 36 and a second arcuate portion 86 without any fuel conduits extending therethrough, the two arcuate portions 84, 86 being separated by the radial wall 76 and by the fitting 48 defining the fuel inlet 78. In a particular embodiment, the first arcuate portion 84 extends around between approximately 240° and 315°. The second arcuate portion 86 is in direct fluid flow communication with the outlet 82 of the air conduits 34a,b. The portion 66a of the duct wall 66 located in the cooling plenum 70 and defining part of the second arcuate portion 86 includes a series of perforations 88 defined therethrough, shown here as elongated slots, to provide for the fluid flow communication between the outlets 82 of the air conduits 34a,b and the cooling plenum 70. The second arcuate portion 86 thus collects the cooled air and distributes it to the cooling plenum 70. The cooling plenum 70 draws the compressed air through the heat exchanger 22 from the high pressure plenum 20, and allows it to circulate around and through the perforated baffle 32 and to the annular cavity 90 (see FIG. 2) defined between the baffle 32 and the turbine support case 92. The perforated baffle 32 creates a pressure differential between plenum 70 and annular cavity 90. This pressure differential allows the cooled air to gain speed through the perforations of the baffle 32 to impingement cool the turbine support case 92, which carries the shroud segments 28. The turbine support case 92 is thus cooled by impingement from the air in plenum 70, passing through the perforations in the baffle 32.

The configuration of the heat exchanger 22 and its location in the high pressure casing 20 can allow for reduced weight in comparison with a heat exchanger necessitating a high pressure casing construction. Its location around the turbine support case may also allow for a reduction in fire hazard: a fuel leak would follow the air flow and as such cause a fire around the support case, which would lead to an increase of temperature which can be easily detected and lead to shut down of the engine. Fuel leaks and fire around the turbine disks may thus be avoided.

Figure 10A:
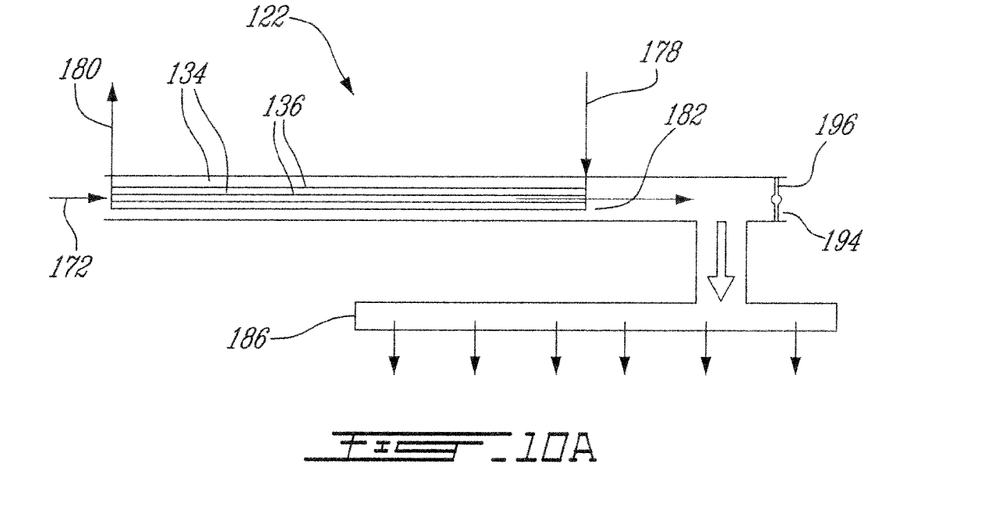
FIG. 10a is a schematic view of a heat exchanger in accordance with another embodiment, with a flow distribution member thereof in a first configuration.
Figure 11A:
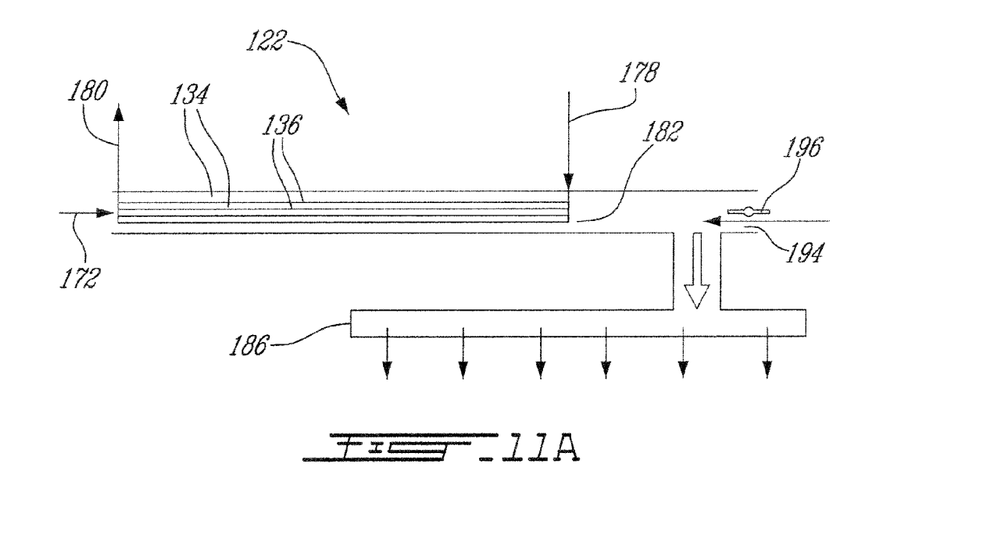
FIG. 11a is a schematic view of the heat exchanger of FIG. 10a with the flow distribution member thereof in a second configuration.

Referring to FIGS. 10a and 11a, a heat exchanger 122 according to an alternate embodiment is schematically shown. The heat exchanger 122 includes at least one fuel conduit 136 and at least one air conduit 134 extending in heat exchange relationship with one another. In the embodiment shown, the heat exchanger 122 is a reverse flow heat exchanger.

The inlet 178 of each fuel conduit 136 is in fluid communication with a fuel source (not shown), and the outlet 180 of each fuel conduit 136 is in fluid communication with the fuel distribution members 17 (see FIG. 1) of the combustor 16. The fuel conduits 136 thus provide a fuel flow communication between the fuel source and the fuel distribution members 17; in a particular embodiment, all of the fuel flow from the fuel source to the combustor 16 circulates through the heat exchanger 122. The quantity of fuel that is required to go through the heat exchanger 122 depends on the architecture of the fuel system and on the cooling requirements of the particular component being cooled; as such, in an alternate embodiment, only the primary flow or only the secondary flow are circulated through the heat exchanger 122.

In a particular embodiment, the heat exchanger 122 is located in the high pressure plenum 20 (see FIG. 1). The inlet 172 of each air conduit 134 is in fluid communication with the high pressure plenum 20. The heat exchanger 122 includes a distribution conduit 186 for distribution of the air to a component to be cooled. The distribution conduit 186 is in fluid communication with the outlet 182 of each air conduit 134.

The heat exchanger 122 further includes a secondary air inlet 194, providing a bypass fluid communication between the high pressure plenum 20 and the distribution conduit 186. A flow selection member 196 (e.g. a valve) selectively blocks the fluid communication between the secondary air inlet 194 and the distribution conduit 186.

The flow selection member 196 has a first configuration where the communication between the secondary air inlet 194 and the distribution conduit 186 is closed and a second configuration where the communication between the secondary air inlet 194 and the distribution conduit 186 is open.

In the first configuration and as shown in FIG. 10a, the compressed air circulates only through the air conduits 134, thus heating the fuel circulating through the fuel conduits 136 and being cooled at the some time. A cooled air is thus provided to the distribution conduit 186 for distribution to the component to be cooled.

In the second configuration shown in FIG. 11a, as the compressed air follows the path of least resistance, most of the compressed air circulates through the secondary air inlet 194 to enter the distribution conduit 186, bypassing the air conduits 134. The majority of the air flow is thus left uncooled. A small flow of air may also circulate through the air conduits 134 to be cooled by the fuel flow. Although the fuel continues to circulate through the heat exchanger 122, it is only minimally heated due to the near stagnant flow of air therethrough.

Figure 10B:
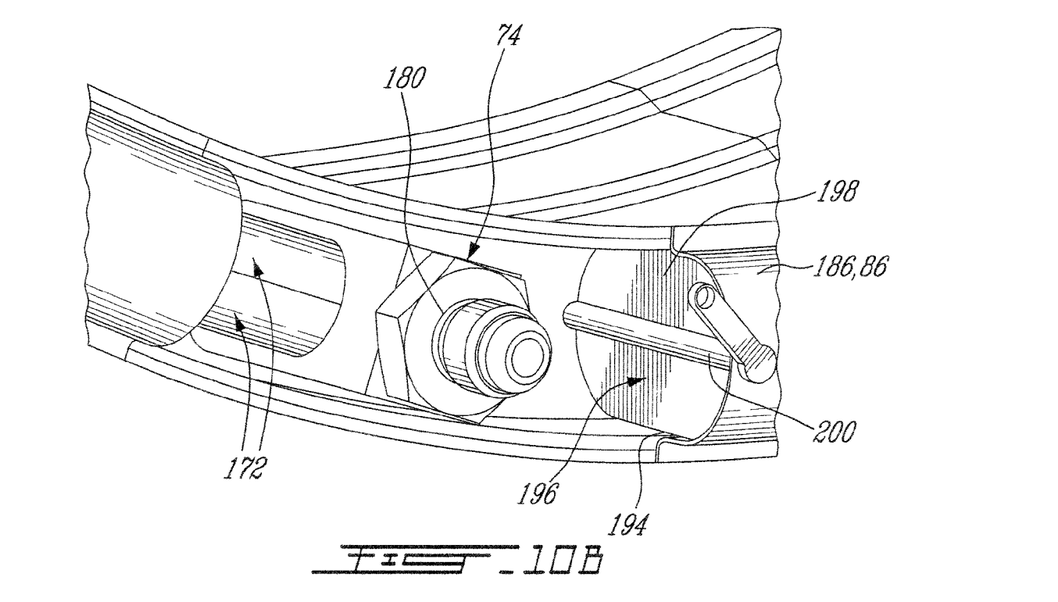
Figure 11B:
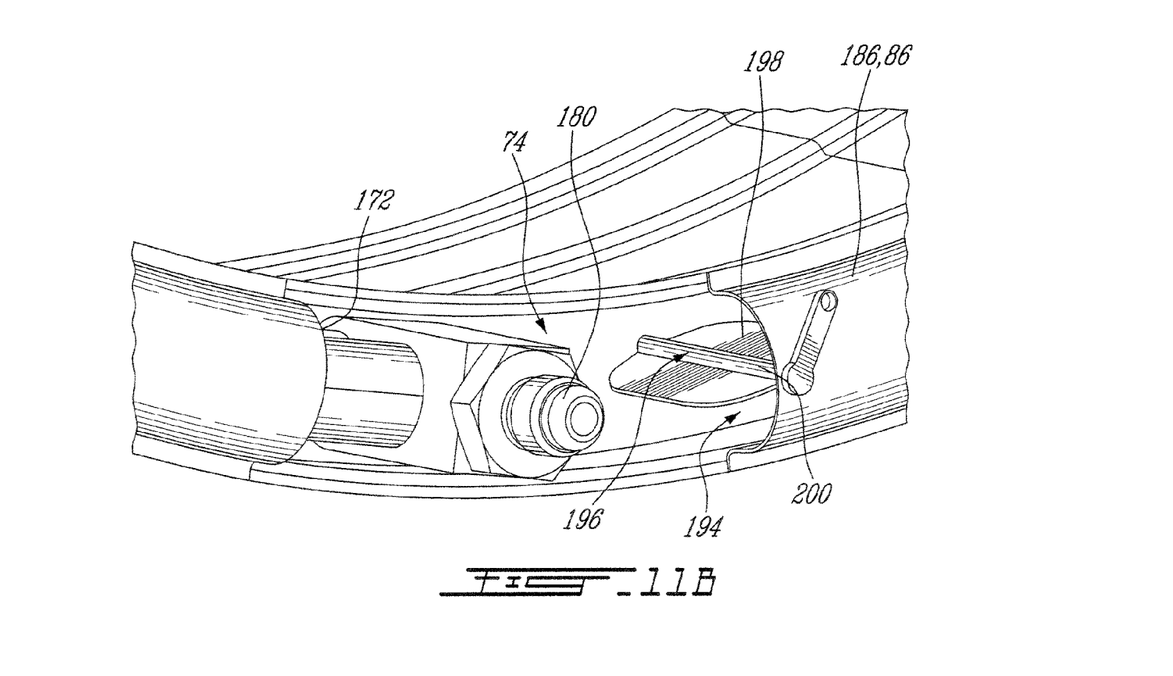
FIG. 11b is a tridimensional view of the part of the heat exchanger of FIG. 10b with the flow distribution member thereof in the second configuration.

Although the heat exchanger 122 is schematically illustrated with straight air and fuel conduits 134, 136 in FIGS. 10a and 11a, such illustration is not intended to be limiting, and alternate configurations are also possible. An exemplary embodiment of the heat exchanger 122 is thus shown in FIGS. 10b and 11b, configured as an annular heat exchanger similar to the one shown in FIGS. 2-9 and described above. As such, components identical to those of the heat exchanger 22 will not be further described herein.

In the embodiment shown, the distribution conduit 186 corresponds to the arcuate portion 86 of the annular duct 30 which is free of the fuel conduits, and which collects the air to distribute it to the cooling plenum 70 through the elongated slots 88 (see FIG. 9). The flow distribution member 196 is provided by a throttle plate or butterfly valve, including a valve disc 198 pivotally mounted on a rod 200 extending through its diameter. The valve replaces the radial wall 76 of FIG. 7. The secondary air inlet 194 is defined by the opening receiving the valve, at the opposite end of the open duct section 74 with respect to the inlet 172 of the air conduits 134. The valve thus pivots between the first configuration (FIG. 10b) where the secondary air inlet 194 is closed and the second configuration (FIG. 11b) where the secondary air inlet 194 is open.

Figure 12A:
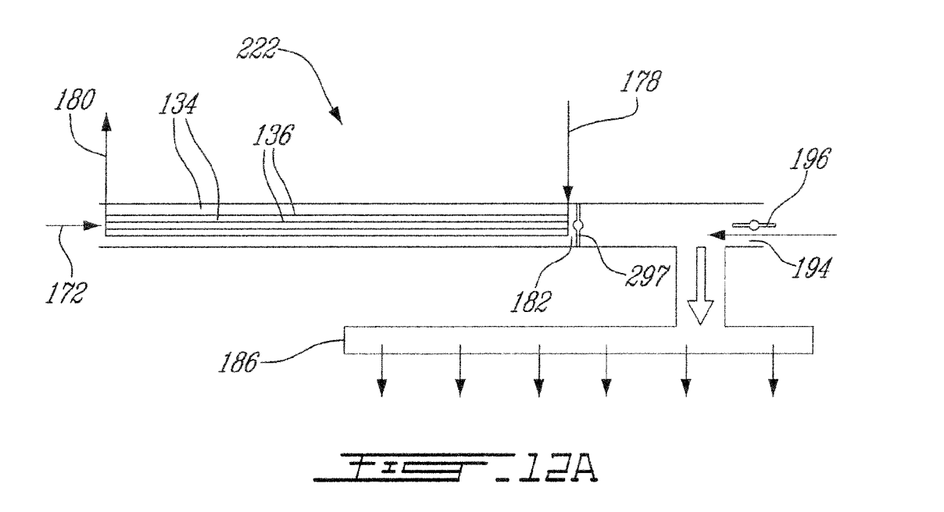
FIG. 12a is a schematic view of a heat exchanger in accordance with another embodiment, with two flow distribution members.

Referring to FIG. 12a, a heat exchanger 222 according to another embodiment is shown, similar to the heat exchanger 122 of FIGS. 10a-11a but with the addition of a second flow selection member 297. The second flow selection member 297 selectively blocks the fluid flow communication between the distribution conduit 186 and the outlet 182 of each air conduit 134. The second flow selection member 297 is movable between a first configuration where the communication between the distribution conduit 186 and the outlet 182 of each air conduit 134 is open and a second configuration where this communication is closed (FIG. 12a).

The two flow selection members 196, 297 are independently movable such as to tailor the mix of cooled air (through the air conduits 134) and hot air (through the secondary air inlet 194) entering the distribution member 186, to obtain a desired temperature for the air being circulated on the component to be cooled. With both flow selection members 196, 297 in the second configuration, all of the compressed air circulates through the secondary air inlet 194 to enter the distribution conduit 186, bypassing the air conduits 134 since the second flow selection member 297 prevents the circulation of the compressed air therethrough. The fuel continues to circulate through the heat exchanger 222 but is not heated since there is no circulation of air therethrough.

Figure 12B:
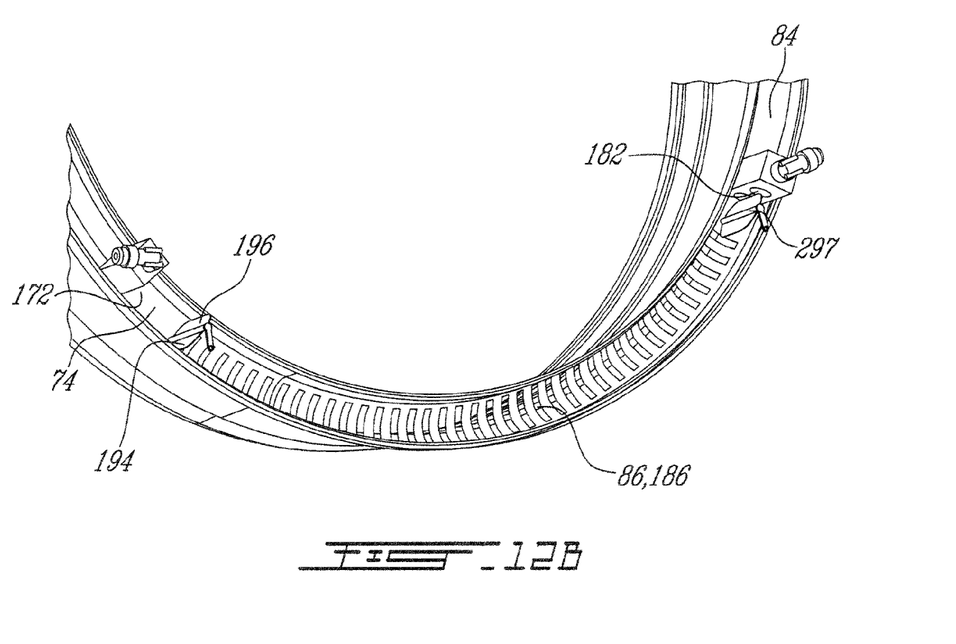

As above, although the heat exchanger 222 is schematically illustrated with straight air and fuel conduits 134, 136 in FIG. 12a, such illustration is not intended to be limiting, and alternate configurations are also possible. An exemplary embodiment of the heat exchanger 222 is thus shown in FIG. 12b, configured as an annular heat exchanger similar to the one of FIGS. 10b-11b. The second flow distribution member 297 is provided by a butterfly valve, located at the air outlet 182 at the junction between the two arcuate portions 84, 86 of the ducts 30. The valve thus pivots between the first configuration (not shown) where the outlet 182 of the air conduits 134 is open and the second configuration (FIG. 12b) where the outlet 182 of the air conduits 134 is closed.

Figure 13A:
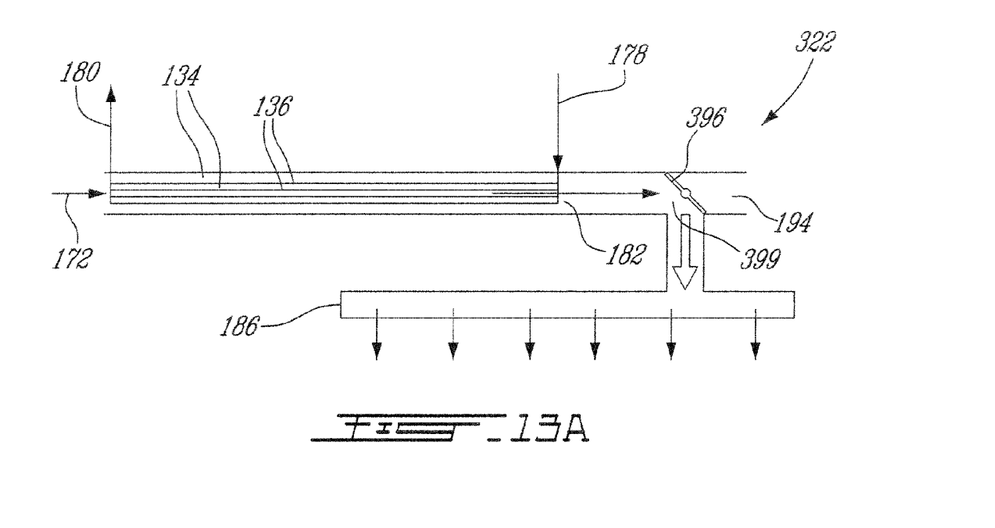
FIG. 13a is a schematic view of a heat exchanger in accordance with another embodiment, with a flow distribution member thereof in a first configuration.
Figure 13B:
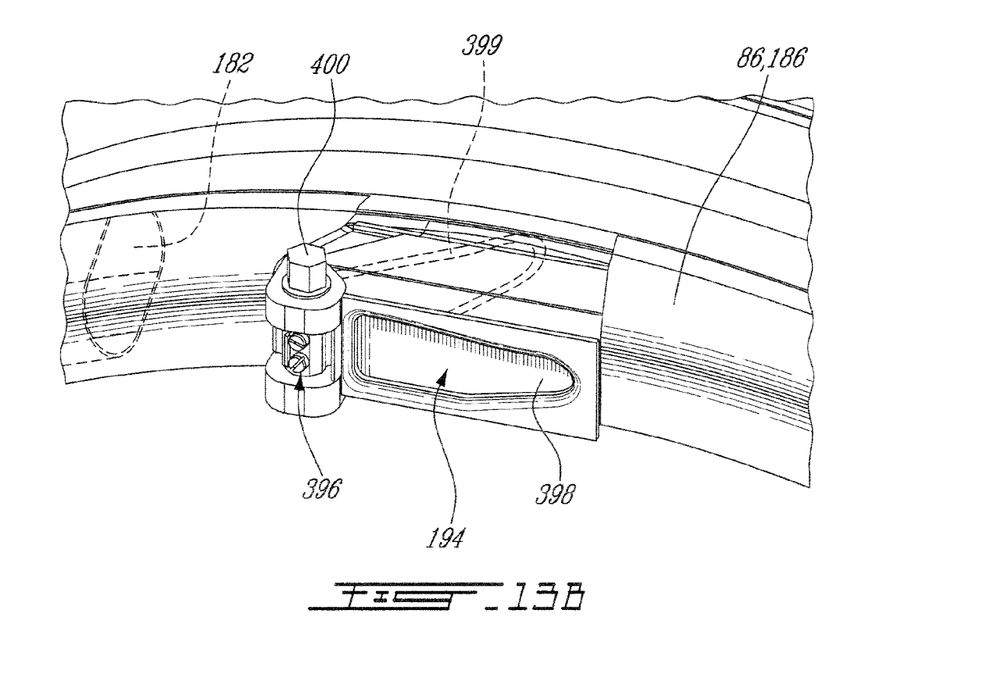
Figure 14A:
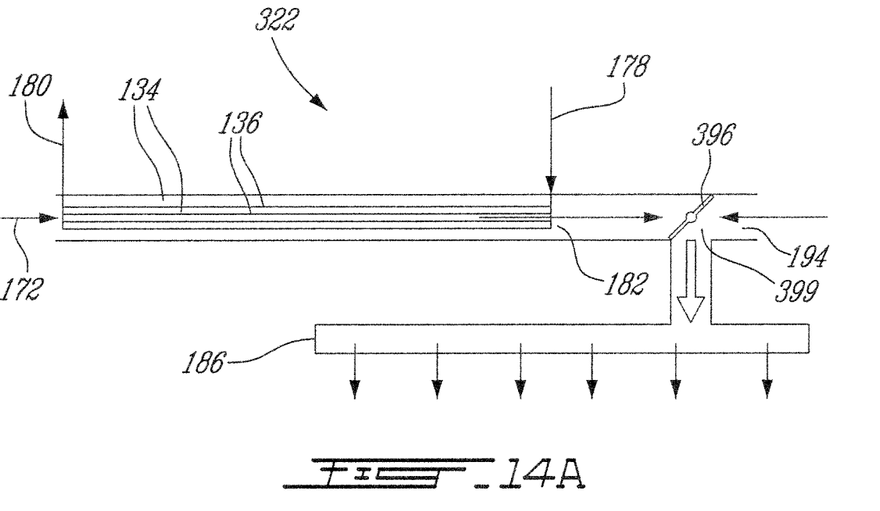
FIG. 14a is a schematic view of the heat exchanger of FIG. 13a with the flow distribution member thereof in a second configuration.
Figure 14B:
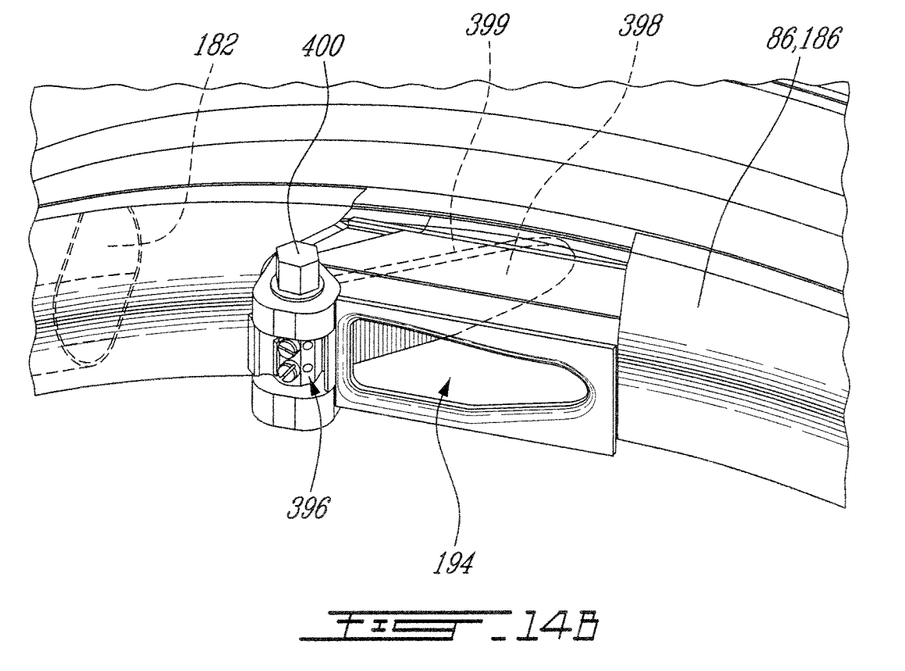
FIG. 14b is a tridimensional view of the part of the heat exchanger of FIG. 13b with the flow distribution member thereof in the second configuration.

Referring to FIGS. 13a and 14a, a heat exchanger 322 according to yet another embodiment is schematically shown. In this embodiment, a single flow selection member 396 is provided, located in a conduit junction 399 providing both the fluid communication between the outlet 182 of each air conduit 134 and the distribution conduit 186 and the fluid communication between the secondary air inlet 194 and the distribution conduit 186. The flow selection member 396 thus has a first configuration where the communication between the secondary air inlet 194 and the distribution conduit 186 is closed while the communication between the air outlet(s) 182 and the distribution conduit 186 is open (FIG. 13a) and a second configuration where the communication between the secondary air inlet 194 and the distribution conduit 186 is open while the communication between the air outlet(s) 182 and the distribution conduit 186 is closed (FIG. 14a).

As above, although the heat exchanger 322 is schematically illustrated with straight air and fuel conduits 134, 136 in FIGS. 13a-14a, such illustration is not intended to be limiting, and alternate configurations are also possible. An exemplary embodiment of the heat exchanger 322 is thus shown in FIGS. 13b-14b, configured as an annular heat exchanger similar to the one of FIGS. 10b, 11b and 12b. The secondary air inlet 194 is defined near the air outlet 182. The flow distribution member 396 is provided by a pivotable valve, which includes a valve plate 398 having one end pivotally mounted on a rod 400 and extending adjacent the secondary air inlet 194. The valve plate 398 pivots between the first configuration where it closes the secondary air inlet 194 (FIG. 13b) and the second configuration where it extends within and across the duct 30 against a corresponding seat to block the communication between the two arcuate portions 84, 86 of the ducts 30 (FIG. 14b) and as such closes the outlet 182 of the air conduits 134, leaving the secondary air inlet 194 open and in communication with the second arcuate portion 86.

In all of the embodiments described above, the flow selection member(s) 196, 297, 396 can also be placed in intermediate positions between their first and second configurations, such as to regulate the proportion of the flow bypassing the air conduits 134 and entering the distribution conduit 186 through the secondary inlet 194 ("hot flow") with respect to the proportion of the flow circulating through the air conduits 134 ("cold flow"). This allows for the cooling of the compressed air to be modulated for example to achieve an active control of the tip clearance of the turbine rotor by mixing the cold and hot flows as required, in a case where the heat exchanger 122, 222, 322 is used to cool the shroud segments 28. The heating of the fuel flow can also be similarly modulated. Appropriate feedback loops may be provided with respect to the air and/of fuel temperature to regulate actuation of the flow selection member(s) 196, 297, 396.

In use, for example when cooling a turbine shroud, bypassing the heat exchanger 122, 222, 322 may allow for reducing of the cooling of the shroud such as to prevent blade tip rubs at certain conditions, for example at takeoff or any operability point in which a pinch point is possible between the turbine shrouds and the blade tips.

The above description is meant to be exemplary only, and one skilled in the art will recognize that changes may be made to the embodiments described without departing from the scope of the invention disclosed. For example, the heat exchanger can be configured such that the air and/of fuel flow therein circulate completely around the component to be cooled. Other modifications which fall within the scope of the present invention will be apparent to those skilled in the art, in light of a review of this disclosure, and such modifications are intended to fall within the appended claims.

The invention claimed is:

1. A fuel air heat exchanger for a gas turbine engine, the heat exchanger comprising:
    an annular duct configured to surround a component to be cooled, the annular duct having a first arcuate portion and a second arcuate portion defining a remainder of the annular duct;
    at least one fuel conduit and at least one air conduit extending in heat exchange relationship with one another, each fuel conduit having an inlet for communication with a fuel source and an outlet for communication with fuel distribution conduits of the engine, each air conduit having an inlet and an outlet each fuel conduit and each air conduit extending circumferentially within the first arcuate portion of the annular duct;
    a distribution conduit in heat exchange relationship with the component to be cooled, the distribution conduit being in fluid communication with the outlet of each air conduit, the distribution conduit being defined by the second arcuate portion of the annular duct, the second arcuate portion being free of the at least one fuel conduit;
    a secondary air inlet in fluid communication with the distribution conduit; and
    a flow selection member selectively movable between first and second configurations, the flow selection member in the first configuration closing the fluid communication between the secondary inlet and the distribution conduit, the flow selection member in the second configuration opening the fluid communication between the secondary air inlet and the distribution conduit.

2. The heat exchanger as defined in claim 1, wherein the flow selection member in the second configuration closes the fluid communication between the outlet of each air conduit and the distribution conduit.

3. The heat exchanger as defined in claim 2, wherein the flow selection member is a valve received in a conduit junction providing the fluid communication between the outlet of each air conduit and the distribution conduit and between the secondary air inlet and the distribution conduit.

4. The heat exchanger as defined in claim 1, wherein the flow selection member is a first flow selection member and is located in a conduit providing the fluid communication between the secondary air inlet and the distribution conduit, the heat exchanger further comprising a second flow selection member located in a conduit providing the fluid communication between the outlet of each air conduit and the distribution conduit and selectively movable between first and second configurations independently of the first flow selection member, the second flow selection member in the first configuration opening the fluid communication between the outlet of each air conduit and the distribution conduit, the second flow selection member in the second configuration closing the fluid communication between the outlet of each air conduit and the distribution conduit.

5. The heat exchanger as defined in claim 1, wherein the heat exchanger further comprises an annular wall element extending from the duct along an approximately axial direction and a perforated baffle extending from the duct along an approximately axial direction and connected to the wall element spaced apart from the duct, the wall element, baffle and an adjacent portion of at least one wall of the duct together forming a closed cross-section defining an annular cooling plenum, the distribution conduit being in fluid communication with the annular cooling plenum.

6. The heat exchanger as defined in claim 1, wherein the at least one air conduit includes a space within the annular duct defined around the at least one fuel conduit.

7. The heat exchanger as defined in claim 1, wherein each fuel conduit is defined by an annular gap between two concentric tubes, and the at least one air conduit includes a conduit defined inside a smallest one of the two concentric tubes.

8. A gas turbine engine comprising:
   a compressor section;
   an annular high pressure plenum in fluid flow communication with a discharge of the compressor section for receiving compressed air;
   a combustor contained in the high pressure plenum;
   a fuel-air heat exchanger including:
      at least one fuel conduit and at least one air conduit located in the high pressure plenum and extending in direct heat exchange relationship with one another, each fuel conduit having an inlet in fluid communication with a fuel source of the engine and an outlet in fluid communication with fuel distribution conduits of the combustor, each air conduit having an inlet in fluid communication with the high pressure plenum and an outlet,
      a distribution conduit located in the high pressure plenum for distribution of air to a component to be cooled, the distribution conduit being in fluid communication with the outlet of each air conduit,
      an annular duct surrounding the engine component to be cooled. each fuel conduit and each air conduit extending circumferentially within the annular duct. the annular duct haying a first arcuate portion containing the at least one fuel conduit and the at least one air conduit, and a second arcuate portion defining a remainder of the annular duct and being free of the at least one fuel conduit. the distribution conduit being defined by the second arcuate portion:
      a secondary air inlet located in the high pressure plenum and providing a bypass fluid communication between the high pressure plenum and the distribution conduit, the bypass fluid communication bypassing each air conduit, and
      a flow selection member selectively movable between first and second configurations, the flow selection member in the first configuration closing the secondary inlet and preventing the bypass fluid communication between the high pressure plenum and the distribution conduit, the flow selection member in the second configuration opening the secondary air inlet and allowing the bypass fluid communication between the high pressure plenum and the distribution conduit.

9. The engine as defined in claim 8, wherein the flow selection member is a valve received in a conduit junction providing the fluid communication between the outlet of each air conduit and the distribution conduit and a fluid communication between the secondary air inlet and the distribution conduit, the flow selection member in the second configuration closing the fluid communication between the outlet of each air conduit and the distribution conduit.

10. The engine as defined in claim 8, wherein the flow selection member is a first flow selection member, the heat exchanger further comprising a second flow selection member selectively movable between first and second configurations independently of the first flow selection member, the second flow selection member in the first configuration opening the fluid communication between the outlet of each air conduit and the distribution conduit, the second flow selection member in the second configuration closing the fluid communication between the outlet of each air conduit and the distribution conduit.

11. The engine as defined in claim 8, wherein the engine component to be cooled is a turbine support case of a turbine section of the engine which is surrounded by an annular cavity, the distribution conduit being in fluid communication with an annular plenum surrounding the annular cavity.

12. The engine as defined in claim 11, wherein the annular cavity surrounding the turbine support case is enclosed by an annular baffle, the plenum being partially defined by the annular baffle, the baffle including perforations providing fluid flow communication between the plenum and the annular cavity for impingement cooling on the turbine support case.

13. A method of regulating a cooling of an engine component of a gas turbine engine, the method comprising:
   circulating compressed air from a compressor discharge of the engine to a high pressure plenum containing a combustor of the engine;
   circulating fuel from a fuel source of the engine through at least one fuel conduit of a heat exchanger located in the high pressure plenum, the fuel circulating in the at least one fluid conduit around only part of a circumference of an annular duct surrounding the engine component; and
   modulating a flow of the compressed air circulating from the high pressure plenum through at least one air conduit of the heat exchanger in direct heat exchange relationship with the at least one fuel conduit thereof in the part of the circumference of the annular duct, and into a distribution conduit defined by a remainder of the circumference of the annular duct and in heat exchange relationship with the engine component.

14. The method as defined in claim 13, wherein modulating the flow includes modulating a bypass flow of compressed air circulating directly from the high pressure plenum into the distribution conduit.

15. The method as defined in claim 13, wherein the engine component is a turbine shroud.

* * * * *